No. 716,104. Patented Dec. 16, 1902.
J. J. REILLY.
DUPLEX PIPE COUPLING.
(Application filed Jan. 6, 1902.)
(No Model.)
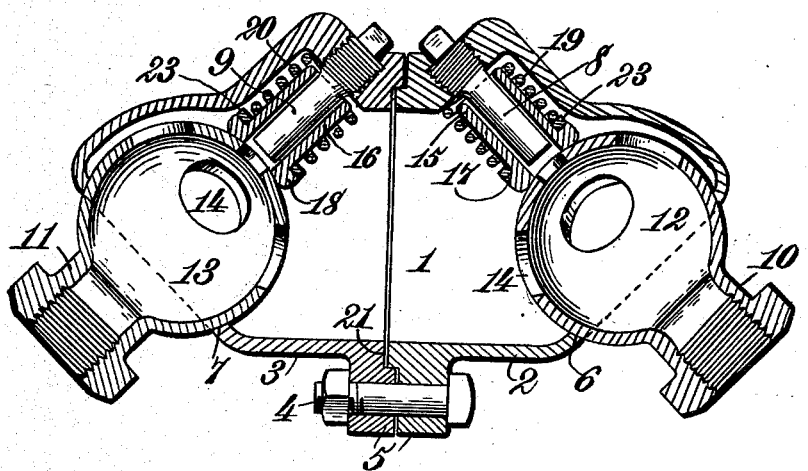
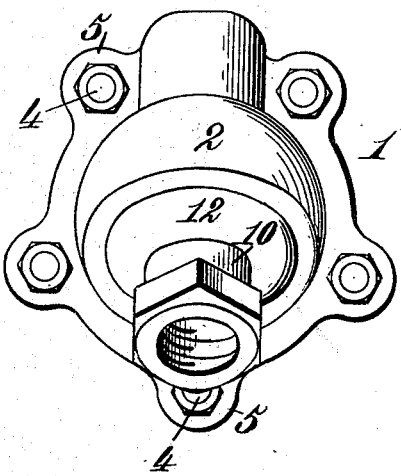
Witnesses.
Robert Cruitt,
Inventor,
John J. Reilly.
By
Atty.

UNITED STATES PATENT OFFICE.

JOHN J. REILLY, OF LOUISVILLE, KENTUCKY.

DUPLEX PIPE-COUPLING.

SPECIFICATION forming part of Letters Patent No. 716,104, dated December 16, 1902.

Application filed January 6, 1902. Serial No. 88,635. (No model.)

*To all whom it may concern:*

Be it known that I, JOHN J. REILLY, a citizen of the United States of America, residing at Louisville, in the county of Jefferson and State of Kentucky, have invented certain new and useful Improvements in Duplex Pipe-Couplings, of which the following is a specification.

In an application for patent filed by me of even date herewith, Serial No. 88,634, I have shown and described certain improvements in pipe-couplings, in which a spring or spring-actuated mechanism is employed for maintaining constant contact at the joint between the two parts of the coupling.

My present invention has the same object in view, but is designed for the production of what I term an "angular" coupling, by means of which the two ends of the pipe connected thereby may be moved to a position in line with each other, parallel to each other, or at any angle between these two positions.

In carrying out my invention I employ a casing having two annular bearing-surfaces thereon located in planes at right angles to each other, pins or projections extending into said shell or casing toward said bearing-surfaces and at right angles to the planes thereof, coupling members having balls or spherical enlargements thereon extending into said shell or casing through the openings surrounded by said bearing-surfaces, sleeves provided with shoulders longitudinally movable on said pins, and springs surrounding said sleeves and acting upon the shoulders thereon for maintaining said balls in constant contact with said bearing-surfaces.

The details of my invention will hereinafter appear, and the novel features thereof will be set forth in the claims.

In the drawings forming part of this specification, Figure 1 is a longitudinal section of an angular pipe-coupling constructed in accordance with my invention, and Fig. 2 is an elevation of the same.

Like reference-numerals indicate like parts in the different views.

The shell or casing 1 is made in two parts 2 3, connected together so as to form a close joint by the bolts 4, which extend through the ears 5 around the outer edge of each part. The said casing is formed at two points with the bearing-surfaces 6 7, the same being shown as located in planes lying at right angles to each other. It is not essential, however, that this particular angle between the planes of the two bearing-surfaces be maintained. Extending down into the casing 1 at points opposite to and in line with the openings which are surrounded by the bearing-surfaces 6 7 are the pins 8 9, the same being externally screw-threaded near their upper ends to correspond with similar internal screw-threads in the upper wall of the casing. These pins have been shown as screwed in place; but it is obvious that they may be connected with the casing 1 in any other suitable manner. In fact, they may, if desired, be formed integral with the separate parts of the casing. The coupling-sections 10 and 11 are formed with hollow balls or spherical enlargements 12 13, which extend into the casing 1 and are adapted to lie in close contact with the bearing-surfaces 6 and 7, respectively, to form impervious joints. To effect this result, the bearing-surfaces 6 and 7 are ground so as to have the same curvature as the outer surfaces of the balls which coöperate therewith. The said balls or spherical enlargements 12 and 13 are each provided with one or more openings 14 for an obvious purpose. Surrounding the pins 8 and 9 are the sleeves 15 16, the same being longitudinally movable on said pins and provided with shoulders 17 18, as clearly shown. The lower ends of the sleeves 15 16 bear against the balls 12 and 13, respectively, and said sleeves are surrounded by the coil-springs 19 and 20. The said springs bear at their upper ends against the upper walls of the shell or casing 1 and at their lower ends against the shoulders 17 and 18 on said sleeves. The same therefore act to force said sleeves downwardly, and the latter constitute presser-blocks for maintaining the outer surfaces of the balls 12 and 13 in constant contact with the bearing-surfaces 6 and 7.

Now it will be observed that the coupling-sections 10 and 11 are free to be moved in any direction with respect to each other or to the casing 1 and that in any position to which they may be turned they are always held in contact with the bearing-surfaces with which they coöperate. Close joints are thereby maintained at all times, and it is impossible for said joints to become leaky by reason of the formation of rust on the bearing-surfaces, as access of moisture or other corroding agent to the bearing parts is effectually avoided. This is due to the fact that no separation of the balls 12 and 13 from the bearing-surfaces 6 and 7, respectively, can be effected and to the further fact that any collection or accumulation of moisture or dust on the exposed portions of the balls will be wiped off by contact with the bearing-surfaces with which they coöperate during the movement of the coupling-sections in one direction or the other.

It has heretofore been stated that a close joint is formed between the two parts 2 and 3 of the casing 1. This is effected by rabbeting the meeting faces of said parts to produce in the part 3 an annular groove or recess 21 and on the part 2 an annular rib or tongue which fits within said groove.

The tension of the springs 19 and 20 may be adjusted by the use of a washer or washers 23, interposed between the ends of said springs and the shoulders on the presser-blocks around which said springs are located.

Having now described my invention, what I claim as new, and desire to secure by Letters Patent, is—

1. In a pipe-coupling, the combination with a casing having an annular bearing-surface surrounding an opening leading into the same and a coupling-section having a ball or spherical enlargement thereon extending into said casing, of a fixed pin or projection in said casing located at an angle to the direction of flow through said casing, a longitudinally-movable sleeve on said pin and a spring acting upon said sleeve to force one end of the same into engagement with the convex outer surface of said ball and to maintain the latter in constant contact with said bearing-surface.

2. In a pipe-coupling, the combination with a casing having an annular bearing-surface surrounding an opening leading into the same, and a coupling-section having a ball or spherical enlargement thereon extending into said casing, of a fixed pin or projection in said casing located at an angle to the direction of flow through said casing, a longitudinally-movable sleeve on said pin having a shoulder thereon, and a coil-spring surrounding said sleeve and acting upon said shoulder to force one end of said sleeve into engagement with the convex outer surface of said ball and to maintain the latter in constant contact with said bearing-surface.

3. In a pipe-coupling, the combination with a shell or casing having two openings therein surrounded by annular bearing-surfaces, the said bearing-surfaces lying in planes at an angle to each other, and coupling-sections having balls or spherical enlargements thereon extending into said casing, of a plurality of fixed pins or projections in said casing located at an angle to each other and at an angle to the direction of flow through said casing, tubular presser-blocks surrounding said pins, openings bearing against the convex outer surfaces of said balls and springs acting upon said presser-blocks and upon fixed parts of said casing for forcing said presser-blocks longitudinally toward said balls and maintaining the latter in constant contact with said bearing-surfaces.

4. In a pipe-coupling, the combination with a shell or casing having two openings therein surrounded by annular bearing-surfaces, the said bearing-surfaces lying in planes at an angle to each other, and coupling-sections having balls or spherical enlargements thereon extending into said casing, of a plurality of fixed pins or projections in said casing located at an angle to each other and at an angle to the direction of flow through said casing, tubular presser-blocks surrounding said pins, the said presser-blocks being provided with shoulders and bearing at their inner ends against the convex outer surfaces of said balls, and coil-springs acting upon said shoulders and upon fixed parts of said casing for forcing said presser-blocks longitudinally into said engagement with said balls and maintaining the latter in constant contact with said bearing-surfaces.

5. In a pipe-coupling, the combination with a shell or casing having two openings therein surrounded by annular bearing-surfaces, the said bearing-surfaces lying in planes at an angle to each other, and coupling-sections having balls or spherical enlargements thereon extending into said casing, of a plurality of pins projecting into said casing opposite said openings, longitudinally-movable sleeves on said pins and springs acting upon said sleeves for forcing the same into engagement with said balls and maintaining the latter in constant contact with said bearing-surfaces.

6. In a pipe-coupling, the combination with a shell or casing having two openings therein surrounded by annular bearing-surfaces, the said bearing-surfaces lying in planes at an angle to each other, and coupling-sections having balls or spherical enlargements thereon extending into said casing, of a plurality of pins extending into said casing opposite said openings, longitudinally-movable sleeves on said pins provided with shoulders and coil-springs surrounding said sleeves and acting upon said shoulders to force said sleeves into engagement with said balls and maintain the latter in constant contact with said bearing-surfaces.

7. In a pipe-coupling, the combination with a shell or casing having two openings therein surrounded by annular bearing-surfaces, the said bearing-surfaces lying in planes at an angle to each other, and coupling-sections having balls or spherical enlargements thereon extending into said casing, of a plurality of angularly-arranged pins extending into said casing, having a screw-threaded connection therewith and located opposite said openings, of longitudinally-movable sleeves on said pins provided with shoulders, and coil-springs surrounding said sleeves and acting upon said shoulders and upon fixed parts of said casing for forcing said sleeves into engagement with said balls and maintaining the latter in constant contact with said bearing-surfaces.

In testimony whereof I have hereunto set my hand in presence of two subscribing witnesses.

JOHN J. REILLY.

Witnesses:
WM. M. STOCKBRIDGE,
EWELL A. DICK.